(12) United States Patent
Nguyen et al.

(10) Patent No.: US 8,132,494 B1
(45) Date of Patent: Mar. 13, 2012

(54) BALLISTIC RESISTANT COMPOSITE ARTICLE HAVING IMPROVED MATRIX SYSTEM

(75) Inventors: Huy X. Nguyen, Chesterfield, VA (US); Leroy C. Lin, Chesterfield, VA (US); Dennis C. Lang, Chesterfield, VA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 07/683,016

(22) Filed: Apr. 10, 1991

Related U.S. Application Data

(63) Continuation-in-part of application No. 07/432,259, filed on Nov. 6, 1989, now Pat. No. 5,330,820.

(51) Int. Cl.
*F41H 5/08* (2006.01)
(52) U.S. Cl. ............... 89/36.05; 89/922; 2/2.5; 428/911
(58) Field of Classification Search .................. 428/162, 428/911; 2/2, 5, 2.5; 89/36.05, 922
See application file for complete search history.

(56) References Cited

U.S. PATENT DOCUMENTS

| | | | |
|---|---|---|---|
| 3,353,187 A | 11/1967 | Lastnik et al. | |
| 3,832,265 A | 8/1974 | Denommee | |
| 4,035,215 A * | 7/1977 | Goldstone | 156/245 |
| 4,131,502 A | 12/1978 | Mitra | |
| 4,403,012 A | 9/1983 | Harpell et al. | 428/290 |
| 4,409,342 A * | 10/1983 | Ancker et al. | 523/202 |
| 4,413,110 A | 11/1983 | Kavesh et al. | 526/348.1 |
| 4,457,985 A | 7/1984 | Harpell et al. | 428/224 |
| 4,501,856 A | 2/1985 | Harpell et al. | |
| 4,543,286 A | 9/1985 | Harpell et al. | 428/288 |
| 4,613,535 A | 9/1986 | Harpell et al. | 428/113 |
| 4,623,574 A | 11/1986 | Harpell et al. | 428/113 |
| 4,650,710 A | 3/1987 | Harpell et al. | 428/263 |
| 4,681,792 A | 7/1987 | Harpell et al. | 428/102 |
| 4,692,479 A * | 9/1987 | Schneider et al. | 523/209 |
| 4,737,401 A | 4/1988 | Harpell | 428/252 |
| 4,737,402 A | 4/1988 | Harpell et al. | 428/252 |
| 4,748,064 A * | 5/1988 | Harpell et al. | 428/113 |
| 4,820,568 A | 4/1989 | Harpell et al. | |
| 4,873,116 A * | 10/1989 | Ancker et al. | 428/36.9 |
| 4,894,281 A | 1/1990 | Yagi et al. | |
| 4,898,770 A * | 2/1990 | Dunbar | 428/283 |
| 4,916,000 A | 4/1990 | Li et al. | 428/105 |
| 4,950,532 A * | 8/1990 | Das et al. | 428/290 |
| 4,996,101 A * | 2/1991 | Landis et al. | 428/272 |
| 5,006,390 A * | 4/1991 | Kavesh et al. | 428/105 |
| 5,028,478 A * | 7/1991 | Odagiri et al. | 428/283 |

FOREIGN PATENT DOCUMENTS

| | | |
|---|---|---|
| EP | 0291859 | 11/1988 |
| FR | 2369916 | 11/1977 |
| GB | 2227450 | 8/1990 |
| JP | 0162869 | 8/1985 |
| WO | 8906190 | 7/1989 |

OTHER PUBLICATIONS

"The Effect of Resin Concentration and Laminating Pressures on Kevlar* Fabric Bonded with a modified Phenolic Resin", Abraham L. Lastnik, United States Army Natick Research & Development Center: Technical Report, (1984) 1-8.

"New Materials and Construction for Improved Helmets", Anthony L. Alesi, U.S. Army Materials and Mechanics Research Center, (1975) 1-10.

The Application of High-Modulus Fibers to Ballistic Protection", R. C. Laible, J. Macromol. Sci-Chem., A7(1), (1973) 295-322.

* cited by examiner

*Primary Examiner* — Stephen M Johnson

(57) ABSTRACT

An impact resistant rigid composite article comprising a fibrous layer comprising a network of filaments dispersed in a rigid matrix comprising one or more thermosetting resins and one or more thermoplastic resins which preferably include one or more initiating/compatibilization agents.

24 Claims, No Drawings

BALLISTIC RESISTANT COMPOSITE ARTICLE HAVING IMPROVED MATRIX SYSTEM

RELATED APPLICATIONS

This is a continuation-in-part application of U.S. patent application Ser. No. 07/432,259, filed Nov. 6, 1989 now U.S. Pat. No. 5,330,820.

BACKGROUND OF THE INVENTION

1. Field of the Invention

This invention relates to ballistic resistant composite articles. More particularly, this invention relates to such articles having improved ballistic protection.

2. Prior Art

Ballistic articles such as bulletproof vests, helmets, structural members of helicopters and other military equipment, vehicle panels, briefcases, raincoats and umbrellas containing high strength fibers are known. Fibers conventionally used include aramid fibers such as poly(phenylenediamine terephthalamide), graphite fibers, nylon fibers, ceramic fibers, glass fibers and the like. For many applications, such as vests or parts of vests, the fibers are used in a woven or knitted fabric. For many of the applications, the fibers are encapsulated or embedded in a matrix material.

In "The Application of High Modulus Fibers to Ballistic Protection", R. C. Laible et al., *J. Macromol. Sci.-Chem.*, A7(1), pp. 295-322, 1973, it is indicated on p. 298 that a fourth requirement is that the textile material have a high degree of heat resistance. In an NTIS publication, AD-A018 958 "New Materials in Construction for Improved Helmets", A. L. Alesi et al., a multilayer highly oriented polypropylene film material (without matrix), referred to as "XP", was evaluated against an aramid fiber (with a phenolic/polyvinyl butyral resin matrix). The aramid system was judged to have the most promising combination of superior performance and a minimum of problems for combat helmet development. U.S. Pat. No. 4,403,012 and U.S. Pat. No. 4,457,985 disclose ballistic resistant composite articles comprised of networks of high molecular weight polyethylene or polypropylene fibers, and matrices composed of olefin polymers and copolymers, unsaturated polyester resins, epoxy resins, and other resins curable below the melting point of the fiber.

A. L. Lastnik, et al., "The Effect of Resin Concentration and Laminating Pressures on KEVLAR Fabric Bonded with Modified Phenolic Resin", Tech. Report NATICK/TR-84/030, Jun. 8, 1984; disclose that an interstitial resin, which encapsulates and bonds the fibers of a fabric, reduces the ballistic resistance of the resultant composite article.

U.S. Pat. Nos. 4,623,574 and 4,748,064 disclose a simple composite structure comprising high strength fibers embedded in an elastomeric matrix. The simple composite structure exhibits outstanding ballistic protection as compared to simple composites utilizing rigid matrices, the results of which are disclosed in the patents. Particularly effective are simple composites employing ultra-high molecular weight polyethylene and polypropylene such as disclosed in U.S. Pat. No. 4,413,110.

U.S. Pat. Nos. 4,737,402 and 4,613,535 disclose complex rigid composite articles having improved impact resistance which comprise a network of high strength fibers such as the ultra-high molecular weight polyethylene and polypropylene disclosed in U.S. Pat. No. 4,413,110 embedded in an elastomeric matrix material and at least one additional rigid layer on a major surface of the fibers in the matrix. It is disclosed that the composites have improved resistance to environmental hazards, improved impact resistance and are unexpectedly effective as ballistic resistant articles such as armor.

U.S. Pat. No. 4,650,710 discloses a ballistic resistant fabric article which comprises at least one network of fibers selected from the group consisting of extended chain polyethylene, polypropylene, polyvinyl alcohol and polyacrylonitrile fibers coated with a low modulus elastomeric material.

U.S. Pat. No. 4,650,710 discloses a flexible article of manufacture comprising a plurality of first flexible layers arranged in a first portion of the article, each of said first layers consisting essentially of fibers having a tensile modulus of at least about 300 g/denier and a tenacity of at least about 15 g/denier and a tenacity of at least about 15 g/denier and a plurality of a second flexible layer arranged in a second portion of said article, each of said second flexible layers comprising fibers, the resistance to displacement of fibers in each of said second flexible layers being greater than the resistance to displacement in each of said first flexible layers.

Other ballistic resistant articles are described in U.S. Pat. Nos. 4,916,000, 4,403,012, 4,457,985, 4,737,401, 4,543,286, 4,563,392 and 4,501,856.

SUMMARY OF THE INVENTION

One aspect of the present invention relates to a ballistic-resistant rigid composite comprised of one or more layers, at least one of said layers is a fibrous layer comprising a network of high strength filaments in a matrix material comprising a blend of one or more thermoplastic polymers and one or more thermosetting resins and effective amount of one or more effective initiating and compatibilization agents which contain one or more moieties which promote the curing of the thermosetting resins and which are compatible therewith and one or more moieties which are compatible with said thermoplastic polymers thereby enhancing the homogeneity of said blend as compared to the homogeneity of the blend in the absence of said agents. As used herein "homogeneity" relates to the degree to which the thermosetting resins and thermoplastic polymers are mixed in the blend and describes the state of uniformity of the blend on the microscopic scale and is observable via electron microscopes or optical microscopes. The composites of this invention exhibit good handling characteristics, long shelf life and resist delamination due to impact. When molded the composites require no or substantially less cooling and short molding cycle times, preferably less than 30 minutes.

DETAILED DESCRIPTION OF THE INVENTION

Composites of this invention comprise a network of filaments in a rigid matrix which comprises one or more thermoplastic polymers and one or more thermosetting resins. The cross-section of filaments for use in this invention may vary widely. Useful filaments may have a circular cross-section, oblong cross-section or irregular or regular multi-lobal cross-section having one or more regular or irregular lobes projecting from the linear or longitudinal axis of the filament. In the particularly preferred embodiments of the invention, the filaments are of substantially circular or oblong cross-section and in the most preferred embodiments are of circular or substantially circular cross-section.

In the composite articles of this invention, the filaments may be arranged in networks having various configurations. For example, a plurality of filaments can be grouped together to form twisted or untwisted yarn bundles in various alignments. The filaments or yarn may be formed as a felt, knitted or woven (plain, basket, satin and crow feet weaves, etc.) into a network, fabricated into non-woven fabric, arranged in parallel array, layered, or formed into a woven fabric by any of a variety of conventional techniques. Among these techniques, for ballistic resistance applications we prefer to use those variations commonly employed in the preparation of aramid fabrics for ballistic-resistant articles. For example, the techniques described in U.S. Pat. No. 4,181,768 and in M. R. Silyquist et al., *J. Macromol Sci. Chem.*, A7(1), pp. 203 et. seq. (1973) are particularly suitable. In preferred embodiments of the invention, the filaments in each layer are aligned in a substantially parallel and unidirectional fashion, and the matrix material substantially coats the individual filaments.

The type of filaments used in the fabrication of the article of this invention may vary widely and can be metallic filaments, semi-metallic filaments, inorganic filaments and/or organic filaments. Preferred filaments for use in the practice of this invention are those having a tenacity equal to or greater than about 10 g/d, a tensile modulus equal to or greater than about 150 g/d and an energy-in-break equal to or greater than about 8 joules/gram. Particularly preferred filaments are those having a tenacity equal to or greater than about 20 g/d, a tensile modulus equal to or greater than about 500 g/d and energy-in-break equal to or greater than about 30 joules/grams. Amongst these particularly preferred embodiments, most preferred are those embodiments in which the tenacity of the filaments are equal to or greater than about 25 g/d, the tensile modulus is equal to or greater than about 1000 g/d, and the energy-to-break is equal to or greater than about 35 joules/grams. In the practice of this invention, filaments of choice have a tenacity equal to or greater than about 30 g/d, the tensile modulus is equal to or greater than about 1300 g/d and the energy-to-break is equal to or greater than about 40 joules/grams.

Filaments for use in the practice of this invention may be metallic, semi-metallic, inorganic and/or organic. Illustrative of useful inorganic filaments are those formed from S-glass, silicon carbide, asbestos, basalt, E-glass, alumina, alumina-silicate, quartz, zirconia-silica, ceramic filaments, boron filaments, carbon filaments, and the like. Exemplary of useful metallic or semi-metallic filaments are those composed of boron, aluminum, steel and titanium. Illustrative of useful organic filaments are those composed of aramids (aromatic polyamides), poly(m-xylylene adipamide), poly(p-xylylene sebacamide), poly (2,2,2-trimethyl-hexamethylene terephthalamide), poly(piperazine sebacamide), poly(metaphenylene isophthalamide) (Nomex) and poly(p-phenylene terephthalamide) (Kevlar) and aliphatic and cycloaliphatic polyamides, such as the copolyamide of 30% hexamethylene diammonium isophthalate and 70% hexamethylene diammonium adipate, the copolyamide of up to 30% bis-(-amidocyclohexyl)methylene, terephthalic acid and caprolactam, polyhexamethylene adipamide (nylon 66), poly(butyrolactam) (nylon 4), poly(9-aminonanoic acid) nylon 9), poly(enantholactam) (nylon 7), poly(caprillactam) (nylon 8), polycaprolactam (nylon 6), poly(p-phenylene terephthalamide), polyhexamethylene sebacamide (nylon 6,10), polyaminoundecanamide (nylon 11), polydodecanolacatam (nylon 12), polyhexamethylene isophthalamide, polyhexamethylene terephthalamide, polycaproamide, poly(nonamethylene azelamide) (Nylon 9,9), poly(decamethylene azelamide) (nylon 10,9), poly(decamethylene sebacamide) (nylon 10,10), poly[bis-4-aminocyclohexyl)methane 1,10-decanedi-carboxamide](Qiana)(trans), or combination thereof; and aliphatic, cycloaliphatic and aromatic polyesters such as poly (1,4-cyclohexylidene dimethyl eneterephthalate) cis and trans, poly(ethylene-2,6-naphthalate), poly(1,4-cyclohexane dimethylene terephthalate) (trans), poly(decamethylene terephthalate, poly(ethylene terephthalate), poly(ethylene isophthalate), poly(ethylene oxybenzoate), poly(para-hydroxy benzoate), poly(β,β dimethylpropiolactone), poly (decamethylene adipate), poly(ethylene succinate) and the like.

Also illustrative of useful organic filaments are those composed of extended chain polymers formed by polymerization of α,β-unsaturated monomers of the formula:

wherein:

$R_1$ and $R_2$ are the same or different and are hydrogen, hydroxy, halogen, alkylcarbonyl, carboxy, alkoxycarbonyl, heterocycle or alkyl or aryl either unsubstituted or substituted with one or more substituents selected from the group consisting of alkoxy, cyano, hydroxy, alkyl and aryl. Illustrative of such polymers of α,β-unsaturated monomers are polymers including polystyrene, polyethylene, polypropylene, poly(1-octadecene), polyisobutylene, poly(1-pentene), poly(2-methylstyrene), poly(4-methylstyrene), poly(1-hexene), poly(1-pentene), poly(4-methoxystyrene), poly(5-methyl-1-hexene), poly(4-methylpentene), poly(1-butene), poly(3-methyl-1-butene), poly(3-phenyl-1-propene), polyvinyl chloride, polybutylene, polyacrylonitrile, poly(methyl pentene-1), poly(vinyl alcohol), poly(vinyl-acetate), polyvinyl butyral), poly(vinyl chloride), poly(vinylidene chloride), vinyl chloride-vinyl acetate chloride copolymer, poly(vinylidene fluoride), poly(methyl acrylate, poly(methyl methacrylate), poly(methacrylo-nitrile), poly(acrylamide), poly (vinyl fluoride), poly(vinyl formal), poly(3-methyl-1-butene), poly(1-pentene), poly(4-methyl-1-butene), poly(1-pentene), poly(4-methyl-1-pentene), poly(1-hexane), poly (5-methyl-1-hexene), poly(1-octadecene), poly(vinyl cyclopentane), poly(vinylcyclohexane), poly(-vinylnaphthalene), poly(vinyl methyl ether), poly(vinylethylether), poly (vinyl propylether), poly(vinyl carbazole), poly(vinyl pyrrolidone), poly(2-chlorostyrene), poly(4-chloro-styrene), poly(vinyl formate), poly(vinyl butyl ether), poly(vinyl octyl ether), poly(vinyl methyl ketone), poly(methylisopropenyl ketone), poly(4-phenylstyrene) and the like.

In the most preferred embodiments of the invention, composite articles include a filament network, which may include a high molecular weight polyethylene filament, a high molecular weight polypropylene filament, an aramid filament, a high molecular weight polyvinyl alcohol filament, a high molecular weight polyacrylonitrile filament or mixtures thereof. U.S. Pat. No. 4,457,985 generally discusses such high molecular weight polyethylene and polypropylene filaments, and the disclosure of this patent is hereby incorporated by reference to the extent that it is not inconsistent herewith. In the case of polyethylene, suitable filaments are those of molecular weight of at least 150,000, preferably at least one million and more preferably between two million and five million. Such extended chain polyethylene (ECPE) filaments may be grown in solution as described in U.S. Pat. No. 4,137,394 to Meihuzen et al., or U.S. Pat. No. 4,356,138 of Kavesh et al., issued Oct. 26, 1982, or a filament spun from a solution to form a gel structure, as described in German Off. 3,004,699 and GB 2051667, and especially described in Application Serial No. 572,607 of Kavesh et al., filed Jan. 20, 1984 (see EPA 64,167, published Nov. 10, 1982). As used herein, the term polyethylene shall mean a predominantly linear polyethylene material that may contain minor amounts of chain branching or comonomers not exceeding 5 modifying units per 100 main chain carbon atoms, and that may also contain admixed therewith not more than about 50 wt % of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as anti-oxidants, lubricants, ultra-violet screening agents, colorants and the like which are commonly incorporated by reference. Depending upon the formation technique, the draw ratio and temperatures, and other conditions, a variety of properties can be imparted to these filaments. The tenacity of the filaments should be at least 15 grams/denier, preferably at least 20 grams/denier, more preferably at least 25 grams/denier and most preferably at least 30 grams/denier. Similarly, the tensile modulus of the filaments, as measured by an Instron tensile testing machine, is at least 300 grams/denier, preferably at least 500 grams/denier and more preferably at least 1,000 grams/denier and most preferably at least 1,200 grams/denier. These highest values for tensile modulus and tenacity are generally obtainable only by employing solution or gel filament processes.

Similarly, highly oriented polypropylene filaments of molecular weight at least 200,000, preferably at least one million and more preferably at least two million may be used. Such high molecular weight polypropylene may be formed into reasonably well oriented filaments by the techniques prescribed in the various references referred to above, and especially by the technique of U.S. Serial No. 572,607, filed Jan. 20, 1984, of Kavesh et al. and commonly assigned. Since polypropylene is a much less crystalline material than polyethylene and contains pendant methyl groups, tenacity values achievable with polypropylene are generally substantially lower than the corresponding values for polyethylene. Accordingly, a suitable tenacity is at least 8 grams/denier, with a preferred tenacity being at least 11 grams/denier. The tensile modulus for polypropylene is at least 160 grams/denier, preferably at least 200 grams/denier. The particularly preferred ranges for the above-described parameters can advantageously provide improved performance in the final article.

High molecular weight polyvinyl alcohol filaments having high tensile modulus are described in U.S. Pat. No. 4,440,711 which is hereby incorporated by reference to the extent it is not inconsistent herewith. In the case of polyvinyl alcohol (PV—OH), PV—OH filament of molecular weight of at least about 200,000. Particularly useful Pv-OH filament should have a modulus of at least about 300 g/d, a tenacity of at least 7 g/d (preferably at least about 10 g/d, more preferably at about 14 g/d, and most preferably at least about 17 g/d), and an energy-to-break of at least about 8 joules/gram. PV—OH filaments having a weight average molecular weight of at least about 200,000, a tenacity of at least about 10 g/d, a modulus of at least about 300 g/d, and an energy-to-break of about 8 joules/gram are more useful in producing a ballistic resistant article. PV—OH filament having such properties can be produced, for example, by the process disclosed in U.S. Pat. No. 4,599,267.

In the case of polyacrylonitrile (PAN), PAN filament of molecular weight of at least about 400,000. Particularly useful PAN filament should have a tenacity of at least about 10 g/d and an energy-to-break of at least about 8 joules/gram. PAN filament having a molecular weight of at least about 400,000, a tenacity of at least about 15 to about 20 g/d and an energy-to-break of at least 8 joules/gram is most useful in producing ballistic resistant articles; and such filaments are disclosed, for example, in U.S. Pat. No. 4,535,027.

In the case of aramid filaments, suitable aramid filaments formed principally from aromatic polyamide are described in U.S. Pat. No. 3,671,542, which is hereby incorporated by reference. Preferred aramid filament will have a tenacity of at least about 20 g/d, a tensile modulus of at least about 400 g/d and an energy-to-break at least about 8 joules/gram, and particularly preferred aramid filaments will have a tenacity of at least about 20 g/d, a modulus of at least about 480 g/d and an energy-to-break of at least about 20 joules/gram. Most preferred aramid filaments will have a tenacity of at least about 20 g/denier, a modulus of at least about 900 g/denier and an energy-to-break of at least about 30 joules/gram. For example, poly(phenylene terephthalamide) filaments produced commercially by Dupont Corporation under the trade name of Kevlar® 29, 49, 129 and 149 having moderately high moduli and tenacity values are useful in forming ballistic resistant composites. Also useful in the practice of this invention is poly(metaphenylene isophthalamide) filaments produced commercially by Dupont under the tradename Nomex®.

The filaments are dispersed in a continuous phase of a rigid matrix material which preferably substantially coats each filament contained in the bundle of filament. The manner in which the filaments are dispersed may vary widely. The filaments may be aligned in a substantially parallel, unidirectional fashion, or filaments may by aligned in a multidirectional fashion with filaments at varying angles with each other. In the preferred embodiments of this invention, filaments in each layer are aligned in a substantially parallel, unidirectional fashion such as in a prepreg, pultruded sheet and the like.

The matrix material employed in the practice of this invention comprises a blend of one or more thermosetting resins, and one or more thermoplastic resins, and includes an effective amount of one or more initiating/compatibilization agents. As used herein "thermoplastic resins" are resins which can be heated and softened, cooled and hardened limitless times without undergoing a basic alteration, "thermosetting resins" are resins which do not tolerate thermal cycling and which cannot be resoftened and reworked after molding, extruding or casting and which attain new, irreversible properties when once set at a temperature which is critical to each resin. An "initiating/compatibilization" agent is a material which has one or more moieties for initiating curing of at least one of the thermosetting resins and which are compatible therewith and which has one or more moieties which are compatible with at least one of said thermoplastic resins resulting in an improvement in the homogeneity of the blend of thermoplastic resins and thermosetting resins.

The proportions of thermosetting material to thermoplastic material in the matrix may vary widely depending on a number of factors including whether the matrix material has any ballistic-resistant properties of its own, the rigidity of the thermoplastic and thermosetting resins, and upon the shape, heat resistance, shelf life, wear resistance, flammability resistance and other desired properties desired for the composite article. In general, the higher the proportion of the thermoplastic resin and the lower the proportion of the thermosetting resin in the matrix, the greater the toughness and impact resistance and the longer the shelf life of the composite. However, longer mold cycle times and mold cooling cycles may be required with greater amounts of the thermoplastic resin. Conversely, the lower the proportion of the thermoplastic resin and the higher the proportion of the thermosetting resin in the matrix, the greater the rigidity and the shorter the mold cycle times and mold cooling cycles of the composites. However, toughness and impact resistance of the composite may be decreased relative to those of composites having greater amounts of the thermoplastic resin, and the shelf life of the composites may be decreased relative to those of composites having greater amounts of the thermoplastic resin. Thus, the relative proportions of thermosetting resins and thermoplastic resins are selected to achieve the desired physical properties and process parameters.

The choice of any thermosetting resin and thermoplastic resin for use in the formation of the matrix may vary widely depending on the desired characteristics of the composite. One important characteristic of the matrix material is its modulus which is preferably equal to or greater than about 500 psi (3,450 kPa). The upper limit for the modulus is not critical and usually the higher the modulus the more desirable are composite properties. In the preferred embodiments of the invention, the thermoplastic and thermosetting resins are selected such that the matrix material has a modulus equal to or greater than about 500 psi (3,450 kPa), and in the particularly preferred embodiments, these resins are selected such that the matrix material has a modulus equal to or greater than about 2,000 psi (13,800 kPa). In the most preferred embodiments of the invention, the thermoplastic and thermosetting resins are selected such that the matrix material has a modulus equal to or greater than about 5,000 psi (34,5000 kPa).

In general, the amount of thermoplastic resin is from about 10 to about 90 vol % based on total volume of the matrix and the amount of thermosetting resin is from about 90 to about 10 vol % on the aforementioned basis. In the preferred embodiments of the invention the amount of thermoplastic resin is from about 20 to about 80 vol % based on the total volume of the matrix and the amount of thermosetting resin is from about 80 to about 20 vol % on the aforementioned basis. In the particularly preferred embodiments, the amount of thermoplastic resin in the matrix is from about 25 to about 75 vol % based on the volume of matrix and the amount of thermosetting material is from about 75 to about 25 vol % on the aforementioned basis. In the most preferred embodiments of the invention, the amount of thermoplastic resin in the matrix is from about 30 to about 70 vol % based on the total volume of the matrix, and the amount of thermosetting resin in the matrix is from about 70 to about 30 vol % on the aforementioned basis.

Thermosetting resins useful in the practice of this invention may vary widely. Illustrative of useful thermosetting resins are alkyds such as those derived from esterification of polybasic acids, as for example, phthalic anhydride, fumaric acid, maleic anhydride, isophthalic acid, terephthalic acid, trimesic acid, hemimellitic acid, succinic anyhydride, fatty acids derived from mineral or vegetable oils and the like, and polyhydric alcohols as for example glycerol, ethylene glycol, propylene glycol, pinacol, 1,4-butanediol, 1,3-propanediol, sorbitol, pentaerythritol, 1,2-cyclohexanediol and the like. Other useful thermosetting resins are acrylics such as crosslinkable polyacrylics, polyacrylates, epoxydiacrylates, urethane diacrylates and the like. Still other useful thermosetting resins are amino resins derived from reaction between formaldehyde and various amino compounds such as melamine, urea, aniline, ethylene urea, sulfonamide, dicyanodiamide and the like. Other useful thermosetting resins include urethanes derived from reaction of polyisocyanates or diisocyanates such as 2,6-tolylene diisocyanate, 2,4-diisocyanate, 4,4'-diphenyl-methane diisocyanate, 4,4'-dicyclohexyl-methane diisocyanate and the like, and polyols such as glycerin, ethylene glycol, diethylene glycol, trimethylolpropane, 1,2,6-hexanetriol, sorbitol, pentaerythritol and the like.

Exemplary of still other thermosetting resins useful in the practice of this invention are unsaturated polyesters derived from reaction of dibasic acids such as maleic anhydride, fumaric acid, adipic acid, azelaic acid and the like, and dihydric alcohols such as ethylene glycol and propylene glycol, 1,3-butylene glycol, 2,3-butylene glycol, diethylene glycol, dipropylene glycols and the like; and silicones such as dimethyldichlorosilane and the like.

Yet another class of useful thermosetting resins are epoxies based on saturated or unsaturated aliphatic, cycloaliphatic, aromatic and heterocyclic epoxides. Useful epoxides include glycidyl ethers derived from epichlorohydrin adducts and polyols, particularly polyhydric phenols. Another useful epoxide is the diglycidyl ether of bisphenol A. Additional examples of useful polyepoxides are resorcinol diglycidyl ether, 3,4-epoxy-6-methylcyclohexylmethyl-9,10-epoxystearate, 1,2,-bis(2,3-epoxy-2-methylpropoxy)ethane, diglycidyl ether of 2,2-(p-hydroxyphenyl) propane, butadiene dioxide, dicyclopentadiene dioxide, pentaerythritol tetrakis (3,4-epoxycyclohexanecarboxylate), vinylcyclohexene dioxide, divinylbenzene dioxide, 1,5-pentadiol bis(3,4-epoxycyclo-hexane carboxylate), ethylene glycol bis(3,4-epoxycyclo-hexane carboxylate), 2,2-diethyl-1,3-propanediol bis(3,4-epoxycyclohexanecarboxylate), 1,6-hexanediol bis(3,4-epoxycyclohexanecarboxylate), 2-butene-1,4-diol bis(3,4-epoxy-6-methylcyclohexanecarboxylate), 1,1,1-trimethylolpropane tris (3,4-epoxycyclohexanecarboxylate), 1,2,3-propanetriol tris(3,4-epoxycyclohexanecarboxylate), dipropylene glycol bis(2-ethylexyl-4,5-epoxycyclohexane-1,2-dicarboxylate), diethylene glycol bis (3,4-epoxy-6-methylcyclohexanecarboxylate), triethylene glycol bis(3,4-epoxycyclohexanecarboxylate), 3,4-epoxycyclohexyl-methyl 3,4-epoxycyclohexanecarboxylate, 3,4-epoxy-1-methylcyclohexylmethyl 3,4-epoxy-1-methylcyclohexane-carboxylate, bis(3,4-epoxycyclohexylmethyl) pimelate, bis(3,4-epoxy-6-methylenecyclohexylmethyl) maleate, bis(3,4-epoxy-6-methylcyclohexylmethyl) succinate, bis(3,4-epoxycyclohexylmethyl) oxalate, bis(3,4-epoxy-6-methylcyclohexylmethyl) sebacate, bis(3,4-epoxy-6-methylcyclohexylmethyl) adipate, bis(3,4-epoxycyclohexylmethyl) terephthalate, 2,2'-sulfonyldiethanol bis(3,4-epoxycyclohexanecarboxylate), N,N'-ethylene bis(4,5-epoxycyclohexane-1,2-dicarboximide), di(3,4-epoxycyclohexylmethyl) 1,3-tolylenedicarbamate, 3,4-epoxy-6-methylcyclohexanecarboxaldehyde acetal, 3,9-bis (3,4-epoxycyclohexyl) spirobi-(methadioxane), and the like.

Useful thermosetting resins also include phenolic resins produced by the reaction of phenols and aldehydes. Useful phenols include phenol, o-cresol, m-cresol, p-cresol, p-tert-butylphenol, p-tertoctylphenol, p-nonylphenol, 2,3-xylenol, 2,4-xylenol, 2,5-xylenol, 2,6-xylenol, 3,1-xylenol, 3,4-xylenol, resorcinol, bisphenol-A and the like. Useful aldehydes include formaldehyde, acetoldehyde, propionaldehyde, n-butyraldehyde, isobutyraldehyde, glyoxal, furfural and the like.

Other useful thermosetting resins are aromatic vinylesters such as the condensation product of epoxide resins and unsaturated acids usually diluted in a compound having double bond unsaturation such as vinylaromatic monomer as for example styrene and vinyltoluene, and diallyl phthalate. Illustrative of useful vinylesters are diglycidyl adipate, diglycidyl isophthalate, di(2,3-epoxybutyl) adipate, di(2,3-epoxybutyl) oxalate, di(2,3-epoxyhexyl) succinate, d(3,4-epoxybutyl) maleate, d(2,3-epoxyoctyl) pimelate, di(2,3-epoxybutyl) phthalate, di(2,3-epoxyoctyl) tetrahydrophthalate, di(4,5-epoxy-dodecyl) maleate, di(2,3-epoxybutyl) terephthalate, di(2,3-epoxypentyl) thiodipropionate, di(5,6-epoxy-tetradecyl) diphenyldicarboxylate, di(3,4-epoxyheptyl) sulphonyldibutyrate, tri(2,3-epoxybutyl) 1,2,4 butanetricarboxylate, di(5,6-epoxypentadecyl) maleate, di(2,3-epoxybutyl) azelate, di(3,4-epoxybutyl) citrate, di(5,6-epoxyoctyl)cyclohexane-1,3-dicarboxylate, di(4,5-epoxyoctadecyl) malonate, bisphenol-A-fumaric acid polyester and the like.

Preferred thermosetting resins for use in the practice of this invention are vinyl esters, unsaturated polyesters, epoxies and phenolics. Particularly preferred thermosetting resins are vinyl esters, epoxies and phenolics, with vinylesters being the thermosetting resin of choice.

Thermoplastic resins for use in the practice of this invention may also vary widely. Illustrative of useful thermoplastic resins are polylactones such as poly(pivalolactone), poly(ϵ-caprolactone) and the like; polyurethanes derived from reaction of diisocyanates such as 1,5-naphalene diisocyanate, p-phenylene diisocyanate, m-phenylene diisocyanate, 2,4-toluene diisocyanate, 4,4' diphenylmethane diisocyanate, 3,3'-dimethyl-4,4' diphenyl-methane diisocyanate, 3,3' dimethyl-4,4' biphenyl diisocyanate, 4,4'-diphenylisopropylidiene diisocyanate, 3,3'-dimethyl-4,4'-biphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, 4,4'-diisocyananodiphenylmethane and the like and linear long-chain diols such as poly(tetramethylene adipate), poly(ethylene adipate), poly(1,4-butylene adipate), poly(1,5-pentylene adipate), poly(1,3 butylene adipate), poly(ethylene succinate), poly(2,3-butylene succinate), polyether diols and the like; polycarbonates such as poly[methane bis (4-phenyl) carbonate], poly[1,1-ether bis(4-phenyl) carbonate], poly[diphenylmethane bis (4-phenyl)carbonate], poly[1,1-cyclohexane bis(4-phenyl)carbonate] and the like; poly sulfones; polyether ether ketones; polyamides such as poly(4-amino butyric acid), poly(hexamethylene adipamide), poly(6-aminohexanoic acid), poly(m-xylylene adipamide), poly(p-xylylene sebacamide), poly(2,2,2-trimethyl hexamethylene terephthalamide), poly(metaphenyleneisophthalamide) (Nomex), poly(p-phenylene terephthalamide) (Kevlar), and the like; polyesters such as poly(ethylene azelate), poly(ethylene-1,5-naphthalate), poly(1,4-cyclohexane dimethylene terephthalate), poly(ethylene oxybenzoate) (A-Tell), poly(para-hydroxy benzoate) (Ekonol), poly(1,4-cyclohexylidene dimethylene terephthalate) (Kodel)(cis), poly(1,4-cyclohexylidene dimethylene terephthalate) (Kodel) (trans), polyethylene terephthalate, polybutylene terephthalate and the like; poly(arylene oxides) such as poly(2,6-dimethyl-1,4-phenylene oxide), poly(2,6-diphenyl-1,4-phenylene oxide) and the like; poly(arylene sulfides) such as poly(phenylene sulfide) and the like; polyetherimides; thermoplastic elastomers such as polyurethane elastomers, fluoroelastomers, butadiene/acrylonitrile elastomers, silicone elastomers, polybutadiene, polyisobutylene, ethylene-propylene copolymers, ethylene-propylene-diene terpolymers, polychloroprene, polysulfide elastomers, block copolymers, made up of segments of glassy or crystalline blocks such as polystyrene, poly(vinyl-toluene), poly(t-butyl styrene), polyester and the like and the elastomeric blocks such as polybutadiene, polyisoprene, ethylene-propylene copolymers, ethylene-butylene copolymers, polyether ester and the like as for example the copolymers in polystyrene-polybutadiene-polystyrene block copolymer manufactured by Shell Chemical Company under the trade name of Kraton®; vinyl polymers and their copolymers such as polyvinyl acetate, polyvinyl alcohol, polyvinyl chloride, polyvinyl butyral, polyvinylidene chloride, ethylene-vinyl acetate copolymers, and the like; polyacrylics, polyacrylate and their copolymers such as polyethyl acrylate, poly(n-butyl acrylate), polymethyl methacrylate, polyethyl methacrylate, poly(n-butyl methacrylate), poly(n-propyl methacrylate), polyacryl-amide, polyacrylonitrile, poly-acrylic acid, ethylene-acrylic acid copolymers, methyl methacrylate-styrene copolymers, ethylene-ethyl acrylate copolymers, methacrylated budadiene-styrene copolymers and the like; polyolefins such as low density polyethylene, polypropylene, chlorinated low density polyethylene, poly(4-methyl-1-pentene) and the like; ionomers; and polyepichlorohydrins.

In the preferred embodiments of the invention, the thermoplastic material is selected from the group consisting of polyurethanes, polyvinyls, polystyrene-polyisoprene-polystyrene block copolymer thermoplastic elastomers, polyacrylics and polyolefins. In the particularly preferred embodiments of the invention the preferred thermoplastic polymer is a polyurethane.

In the blend of the invention, includes an initiating/compatibilization agent. This material serves a dual purposes. It promotes the cure of the thermosetting resin and enhances the homogeneity of the blend. Initiating/compatibilization agents for used in the practice of this invention may vary widely depending on the particular thermoplastic polymer(s) and thermosetting resin(s) forming the matrix blend. Useful initiating/compatibilization agents are those which contain moieties which can promote the curing of the curable thermosetting resin, preferably resulting in a residue which becomes part of the cured resin, and which have one or more moieties which are compatible with the thermoplastic polymer contained in said blend. The compatibility of a moiety in a thermoplastic polymer can be determined through conventional means as for example the Hilderbrand expression for the square root of the cohesive energy density which is defined as the solubility parameter ($\delta$) or the Smalls molar attraction constants as described in more detail in "Properties and Structure of Polymers" by A. V. Tobolsky, Wiley and Sons, New York (1960) as follows:

$$\delta = (\Delta E/V_e)^{1/2}$$

where $\Delta E$ is the molar energy of evaporation of the thermoplastic polymer or thermosetting resin; and $V_e$ is the molar volume of a neutral solvent. Also, see Small, PA, *J. Appl. Chem., a,* 71, (1953). As a result, the initiating/compatibilization agent enhances the homogeneity of the blend by promoting the mixing of dissimilar materials.

The agents may be multifunctional, containing functionalities which promote the cure of the curable resin and containing functionalities which are compatible with the thermoplastic resin as described above. The agents may also be mixtures of materials, one class of materials having moieties which are compatible with the thermoplastic polymer. Agents for use in any particular situation will depend on the particular resin and polymer employed. For example, when the resin is an epoxy and the polymer is a poly(lactone) such as poly(pivaloyllactone), useful agents will include moieties which act as curing agents for the cure of the epoxy resin, such as polyamines, anhydrides, thiols and polybasic acid functions, and moieties which are compatible with the thermoplastic resin such as carboxylic acid ester functions. Illustrative of such materials are compounds which include an amine function (preferably a primary amine function) and a carboxylic acid ester function such as acetate. Similarly, when the thermosetting resin is the epoxy resin and the thermoplastic resin is a polyamide, useful agents will include one or more moeities which initiate the curing of an epoxy resin such as those listed above, and one or more functionalities which are compatible with the thermoplastic polyamide such as allyl ester functions. When the curable thermosetting resin is a vinyl ester resin and the thermoplastic polymer is a poly(vinyl butyral), useful agents will include moieties which promote the curing of the vinyl ester such as a peroxide function and the like, and moieties which are compatible with the poly(vinyl butyral) such as vinyl groups, aromatic groups and the like. Illustrative of such materials is benzoyl peroxide.

In the preferred embodiments of the invention useful initiating/compatibilization agents are materials which include aliphatic and aromatic peroxide functions and which functions derived from the condensation of polyamines with fatty acids or dimer acids. Particularly preferred initiating/compatibilization agents are materials containing alkyl peroxide or aryl peroxide functions and polyamide and amidoamine resins; and most preferred initiating/compatibilization agents are materials containing benzoyl peroxide and polyamide functions such as the polyamide sold by Henkel Corporation under the tradename (Versamid®)

An "effective amount" of a useful initiator/compatibilization agent is employed. As used herein an "effective amount" is an amount which is effective to homogenize the blend to the desired extent. Usually, this effect can be obtained where the amount of initiating/compatibilization agent is at least about 1% by weight of the blend. In the preferred embodiments of the invention the amount of initiator/compatibilization agent employed is from about 1% to about 20% by weight of the blend and in the more preferred embodiment the amount of initiator/compatibilization agent is from about 1% to about 10% by weight of the blend.

Useful initiator/compatibilization agent and the amounts thereof, and other reaction parameters required in the curing and polymerization step are well known in the art and will not be described herein in great detail. Illustrative of such useful initiators and reaction parameters are those described in "Preparative Methods of Polymer Chemistry", Sorenson & Campbell, Interscience Publishers (1978) which is incorporated herein by reference.

The proportions of matrix to filament in the composite is not critical and may vary widely depending on a number of factors including, whether the matrix material has any ballistic-resistant properties of its own (which is generally not the case) and upon the rigidity, shape, heat resistance, wear resistance, flammability resistance mold cycle time, handling characteristics and other properties desired for the composite article. In general, the proportion of matrix to filament in the composite may vary from relatively small amounts where the amount of matrix is about 10% by volume of the filaments to relatively large amounts where the amount of matrix is up to about 90% by volume of the filaments. In the preferred embodiments of this invention, matrix amounts of from about 15 to about 85% by volume are employed. All volume percents are based on the total volume of the composite. In the particularly preferred embodiments of the invention, ballistic-resistant articles of the present invention contain a relatively minor proportion of the matrix (e.g., about 10 to about 30% by volume of composite), since the ballistic-resistant properties are almost entirely attributable to the filament, and in the particularly preferred embodiments of the invention, the proportion of the matrix in the composite is from about 10 to about 30% by volume of filaments.

The articles of this invention can be fabricated using a number of procedures. In general, the layers are formed by molding the combination of the matrix material and filaments in the desired configurations and amounts by subjecting the combination to heat, and pressure during a mold cycle time. An advantage of those embodiments of this invention in which the thermosetting resin is a vinyl ester is that relative short mold cycle times and temperatures may be employed.

The filaments may be premolded by subjecting them to heat and pressure. For example, for extended chain polyethylene filaments, molding temperatures range from about 20 to about 150° C., preferably from about 80 to about 145° C., more preferably from about 100 to about 135° C. depending on the type of matrix material selected. The molding pressure may range from about 10 psi (69 kPa) to about 10,000 psi (69,000 kPa). A pressure between about 10 psi (69 kPa) and about 100 psi (690 kPa), when combined with temperatures below about 100° C. for a period of time less than about 1.0 min., may be used simply to cause adjacent filaments to stick together. Pressures from about 100 psi to about 10,000 psi (69,000 kPa), when coupled with temperatures in the range of about 100 to about 155° C. for a time of between about 1 to about 5 min., may cause the filaments to deform and to compress together (generally in a film-like shape). Pressures from about 100 psi (690 kPa) to about 10,000 psi (69,000 kPa), when coupled with temperatures in the range of about 150 to about 155° C. for a time of between 1 to about 5 min., may cause the film to become translucent or transparent. For polypropylene filaments, the upper limitation of the temperature range would be about 10 to about 20° C. higher than for ECPE filament.

In the preferred embodiments of the invention, the filaments (premolded if desired) are precoated with the desired matrix material prior to being arranged in a network and molded as described above. The coating may be applied to the filaments in a variety of ways and any method known to those of skill in the art for coating filaments may be used. For example, one method is to apply the matrix material to the stretched high modulus filaments either as a liquid, a sticky solid or particles in suspension, or as a fluidized bed. Alternately, the matrix material may be applied as a solution or emulsion in a suitable solvent which does not adversely affect the properties of the filament at the temperature of application. In these illustrative embodiments, any liquid capable of dissolving or dispersing the matrix material may be used. However, in the preferred embodiments of the invention useful solvents include water, paraffin oils, ketones, alcohols, aromatic solvents or hydrocarbon solvents or mixtures thereof, with illustrative specific solvents including paraffin oil, xylene, toluene and octane. The techniques used to dissolve or disperse the matrix in the solvents will be those conventionally used for the coating of thermoplastic resins on a variety of substrates.

Other techniques for applying the coating to the filaments may be used, including coating of the high modulus precursor (gel filament) before the high temperature stretching operation, either before or after removal of the solvent from the filament. The filament may then be stretched at elevated temperatures to produce the coated filaments. The gel filament may be passed through a solution of the appropriate matrix material, as for example an elastomeric material dissolved in paraffin oil, or an aromatic or aliphatic solvent, under conditions to attain the desired coating. Crystallization of the polymer in the gel filament may or may not have taken place before the filament passes into the cooling solution. Alternately, the filament may be extruded into a fluidized bed of the appropriate matrix material in powder form.

The proportion of coating on the coated filaments or fabrics may vary from relatively small amounts (e.g., 1% by weight of filaments) to relatively large amounts (e.g., 150% by weight of filaments), depending upon whether the coating material has any impact or ballistic-resistant properties of its own (which is generally not the case) and upon the rigidity, shape, heat resistance, wear resistance, flammability resistance and other properties desired for the complex composite article. In general, ballistic-resistant articles of the present invention containing coated filaments should have a relatively minor proportion of coating (e.g., about 10 to about 30 percent by volume of filaments), since the ballistic-resistant properties are almost entirely attributable to the filament. Nevertheless, coated filaments with higher coating contents may be employed. Generally, however, when the coating constitutes greater than about 60% (by volume of filament), the coated filament is consolidated with similar coated filaments to form a simple composite without the use of additional matrix material.

Furthermore, if the filament achieves its final properties only after a stretching operation or other manipulative process, e.g. solvent exchanging, drying or the like, it is contemplated that the coating may be applied to a precursor material of the final filament. In such cases, the desired and preferred tenacity, modulus and other properties of the filament should be judged by continuing the manipulative process on the filament precursor in a manner corresponding to that employed on the coated filament precursor. Thus, for example, if the coating is applied to the xerogel filament described in U.S. Application Ser. No. 572,607 of Kavesh et al., and the coated xerogel filament is then stretched under defined temperature and stretch ratio conditions, then the filament tenacity and filament modulus values would be measured on uncoated xerogel filament which is similarly stretched.

It is a preferred aspect of the invention that each filament be substantially coated with the matrix material for the production of composites having improved impact protection, delamination resistance, rigidity and/or ballistic resistance, and relatively shorter mold cycle times, preferably of less than about 30 minutes. A filament is substantially coated by using any of the coating processes described above or can be substantially coated by employing any other process capable of producing a filament coated essentially to the same degree as a filament coated by the processes described heretofore (e.g., by employing known high pressure molding techniques).

The filaments and networks produced therefrom are formed into "simple composites" as the precursor to preparing the complex composite articles of the present invention. The term, "simple composite", as used herein is intended to mean composites made up of one or more layers, each of the layers containing filaments as described above with a single major matrix material, which material may include minor proportions of other materials such as fillers, lubricants or the like.

The proportion of matrix material to filament is variable for the simple composites, with matrix material amounts of from about 5% to about 150 vol %, by volume of the composite, representing the broad general range. Within this range, it is preferred to use composites having a relatively high filament content, such as composites having only about 10 to about 30 vol % matrix material by volume of the composite.

Stated another way, the filament network occupies different proportions of the total volume of the simple composite. Preferably, however, the filament network comprises at least about 30 volume percent of the simple composite. For ballistic protecting, the filament network comprises at least about 50 volume percent, more preferably about 70 volume percent, and most preferably at least about 75 volume percent, with the matrix occupying the remaining volume.

A particularly effective technique for preparing a preferred composite of this invention comprised of substantially parallel, unidirectional aligned filaments includes the steps of pulling a filament or bundles of filaments through a bath containing a solution of a matrix material and circumferentially winding this filament into a single sheet-like layer around and along a bundle of filaments the length of a suitable form, such as a cylinder. The solvent, if used, is then evaporated leaving a sheet-like layer of filaments embedded in a matrix that can be removed from the cylindrical form. Alternatively, a plurality of filaments or bundles of filaments can be simultaneously pulled through the bath containing a solution or dispersion of a matrix material and laid down in closely positioned, substantially parallel relation to one another on a suitable surface. Evaporation of the solvent leaves a sheet-like layer comprised of uni-directional filaments which are coated with the matrix material and which are substantially parallel and aligned along a common filament direction. The sheet is suitable for subsequent processing such as laminating to another sheet to form composites containing more than one layer.

Similarly, a filament-type simple composite can be produced by pulling a group of filament bundles through a dispersion or solution of the matrix material to substantially coat each of the individual filaments, and then evaporating the solvent to from the coated yarn. The yarn can then, for example, be employed to form fabrics, which in turn, can be used to form more complex composite structures. Moreover, the coated yarn can also be processed into a simple composite by employing conventional filament winding techniques; for example, the simple composite can have coated yarn formed into overlapping filament layers.

The number of layers included in the composite of this invention may vary widely depending on the uses of the composite, for example, in those uses where the composite would be used as ballistic protection, the number of layers would depend on a number of factors including the degree of ballistic protection desired and other factors known to those of skill in the ballistic protection art. In general for this application, the greater the degree of protection desired the greater the number of layers included in the article for a given weight of the article. Conversely, the lessor the degree of ballistic protection required, the lessor the number of layers required for a given weight of the article. It is convenient to characterize the geometries of such composites by the geometries of the filaments and then to indicate that the matrix material may occupy part or all of the void space left by the network of filaments. One such suitable arrangement is a plurality of layers or laminates in which the coated filaments are arranged in a sheet-like array and aligned parallel to one another along a common filament direction. Successive layers of such coated, uni-directional filaments can be rotated with respect to the previous layer. An example of such laminate structures are composites with the second, third, fourth and fifth layers rotated +45°, −45°, 90° and 0°, with respect to the first layer, but not necessarily in that order. Other examples include composites with 0°/90° layout of yarn or filaments.

One technique for forming composites of this invention having more than one layer includes the steps of arranging coated filaments into a desired network structure, and then consolidating and heat setting the overall structure to cause the coating material to flow and occupy the remaining void spaces, thus producing either a continuous or a discontinuous matrix without a mold cooling cycle or with a relatively short mold cooling cycle. Another technique is to arrange layers or other structures of coated or uncoated filament adjacent to and between various forms, e.g. fabric films, of the matrix material and then to consolidate and heat set the overall structure. In the above cases, it is possible that the matrix can be caused to stick or flow without completely melting. In general, if the matrix material is caused to melt, relatively little pressure is required to form the composite; while if the matrix material is only heated to a sticking point, generally more pressure is required. Also, the pressure and time to set the composite and to achieve optimal properties will generally depend on the nature of the matrix material (chemical composition as well as molecular weight) and processing temperature.

The composites of this invention comprising one or more layers may be incorporated into complex composites. For example, such composites may be incorporated into more complex composites to provide a more rigid complex composite article suitable, for example, as structural ballistic-resistant components, such as helmets, structural members of aircraft, and vehicle panels. The term "rigid" as used in the present specification and claims, is intended to include semi-flexible and semi-rigid structures that are capable of being free standing, without collapsing. To form the complex composite, at least one substantially rigid layer is bonded or otherwise connected to a major surface of the mono or multi-layer composite. The resultant complex composite article is capable of standing by itself and is impact and delamination resistant. Where there is only one layer, the composite of this invention ordinarily forms a remote portion of the complex composite article; that is a portion that is not initially exposed to the environment, e.g., the impact of an oncoming projectile. Where there is more than one layer, the simple composite may form, for example, a core portion that is sandwiched between two or more rigid layers, as is particularly useful, for example, in helmet applications. Other forms of the complex composite are also suitable, for example a composite comprising multiple alternating layers of simple composite and rigid layer.

In the preferred embodiments of the invention, rigid layers are preferably comprised of an impact resistant material, such as steel plate, composite armor plate, ceramic reinforced metallic composite, ceramic plate, concrete, and high strength filament composites (for example, an aramid, polyethylene or glass filament and a high modulus, resin matrix such as an epoxy resin, a phenolic resin, a vinyl ester resin, an unsaturated polyester, nylon 6, nylon 6,6 and polyvinylidine halide). Most preferably, the rigid impact resistant layer is one which is ballistically effective, such as ceramic plates or ceramic reinforced metal composites. A desirable embodiment of our invention is the use of a rigid impact resistant layer which will at least partially deform the initial impact surface of the projectile or cause the projectile to shatter such as aluminum oxide, boron carbide, silicon carbide and beryllium oxide (see Laible, supra, Chapters 5-7 for additional useful rigid layers). For example, a particularly useful ballistic resistant complex composite comprises a simple composite comprising highly-oriented high molecular weight polyethylene filament in a matrix on which is formed at least one layer comprising a material which may be heat resistant, flame resistant, solvent resistant, radiation resistant, or combinations thereof such as stainless steel, copper, aluminum oxides, titanium, titanium boride and the like.

A portion of the rigid impact resistant composite, the volume percent of the simple composite is variable depending upon the desired properties of the final product. The volume percent of the simple composite to the complex composite is ordinarily at least about 10%, preferably at least about 15%, and most preferably at least 20% (for maximizing ballistic resistance). The volume percent of the simple composite to the complex composite is ordinarily at least about 5%, preferably at least about 10%, and most preferably at least about 15% (for maximizing ballistic resistance). The examples illustrate the effectiveness of a simple composite in a complex structure at various percentages of the simple composite to the total. For example, various compromises between structural rigidity and ballistic performance are attainable depending upon the specific material choices and the relative properties of the simple composites and rigid layers.

The multilayer composites of this invention exhibits enhanced peel strength as compared to conventional multi-layer composites which results in reduced delamination of the composite on impact. In the preferred embodiments of the invention, peel strength between at least two adjacent layers of the multilayer composite is at least about 1.5 lbs/in as determined by the peel resistance test of ASTM-D-1876-72, and in the more preferred embodiments of the invention, the peel strength between at least two adjacent layers of the composite is equal to or greater than about 3 lbs/in. In the most preferred embodiments of the invention, the peel strength between at least two adjacent layers of the composite is equal to or greater than about 6 lbs/in, with those multilayer composites having layer peel strength equal to or greater than about 8 lbs/in being the composites of choice.

The composites of this invention can be used for conventional purposes. For example, such composites can be used in the fabrication of structural parts, ballistic armor and the like using conventional methods.

The following examples are presented to provide a more complete understanding of the invention and are not to be construed as limitations thereon. In the examples, the following technical terms are used:

(a) "Areal Density" which is the weight of the armor material per unit area usually in $Kg/m^2$ or $lb/ft^2$.

(b) "$V_{50}$" which is the projectile velocity which is statistically at the borderline penetration and partial penetrations which has a 50% probability of penetrating the target. The specific techniques, conditions, materials, proportions and reported data set forth to illustrate the principles of the invention are exemplary and should not be construed as limiting the scope of the invention.

Example I

This example illustrates the advantages of using a homogeneous blend of a thermoplastic polyamide and a thermoset epoxy as the matrix-resin system. The blend resin system is formulated as shown in Table I.

TABLE I

| Components | | Weight (g) |
| --- | --- | --- |
| 1 | Araldite 6010 (a) | 15 |
| 2 | Versamide 115 (b) | 15 |
| 3 | Macromelt 6211 (c) | 120 |
| 4 | Toluene (d) | 500 |

(a) "Araldite 6010" is an epoxy manufactured and sold by Ciba-Geigy Corporation of Hawthorne, N.Y.

(b) "Versamide 115" is a polyamide crosslinking agent manufactured and sold by Henkel Corporation of Minneapolis, Minn., under CAS No. 68410231 has functional groups which are compatible with polyamides. Araldite 6010 is crosslinked with Versamide 115.

(c) "Macromelt 6211" is a thermoplastic polyamide manufactured and sold by Henkel Corporation of Minneapolis, Minn.

(d) "Toluene was used as a solvent to control the viscosity of the blend for application.

The above components were homogeneously mixed within a container. The weight ratio between the thermoplastic polyamide (Macromelt 6211) and thermoset epoxy (Araldite 6010) was 80/20. Using this resin system and Spectra 1000 fiber in fabric style 952 (34×34 plain weave fabric, commercially available from Allied-Signal Corporation), prepreg was made with approximately 80% fiber by weight and 20% resin by weight. The prepreg was cut into strips of 9" by 1" which were then stacked together. Coupons consisting of 6 layers (strips) were molded under pressure of 1000 psi at a temperature of 121° C. for 30 min. These coupons were tested for peel resistance according to ASTM 1876-72, modified by holding the unpeeled portion of the test coupon parallel to the direction of the applied peel force.

The results are shown in Table II. Ballistic data were not generated for the blend, but it was inferred from the respective $V_{50}$ of Macromelt and vinyl ester that the $V_{50}$ of the blend is between 1808 ft/sec and 2000 ft/sec. The peel resistance, which is also an indicator of resistance to deformation and delamination of the blend is much higher than those of the individual resins.

TABLE II

|  | Areal Density (lb/ft$^2$) | $V_{50}$ (ft/sec) | Peel Strength (lb/in) |
| --- | --- | --- | --- |
| Macromelt 6211 (a) | 1.55 | 2000 | 2.6 |
| Blend | N/A* | N/A* | 3.9 |
| Vinyl Ester (b) | 1.55 | 1808 | 1.5 |

(a) 30 g Macromelt 6211 dissolved in a mixture of 50 g Toluene and 50 g isopropyl alcohol.
(b) 30 g solid Derakane 8084 dissolved in 100 g of Toluene. Vinyl ester resin was crosslinked with 0.36 g of Lupersol 256.

Example II

This example illustrates yet another blend of thermoplastic and thermoset. The formulation is given in Table III.

TABLE III

| | Components | Weight (g) |
| --- | --- | --- |
| 1 | Derakane 8084 | 50 |
| 2 | Benzoyl Peroxide (a) | 1 |
| 3 | Polyvinyl Butyral (b) | 25 |
| 4 | Acetone (c) | 50 |
| 5 | Toluene (c) | 25 |
| 6 | Denatured ethyl alcohol (c) | 25 |

(a) Benzoyl Peroxide is a crosslinking agent for Derakane 8084 vinyl ester.
(b) Polyvinyl Butyral used is manufactured and sold by Monsanto under the trade name Butvar 90.
(c) Acetone, toluene and denatured ethyl alcohol comprise a mixed solvent system.

The above formulation was prepregged onto Spectra® 1000 fiber in fabric style 952. The ratio by weight of fiber to dry resin (no solvent) was 79/21. Panels comprised of 30 plies of this prepreg were molded under a pressure of 2000 psi at a temperature of 105° C. for 20 min. The resultant panels have an areal density of 1.55 lb/ft$^2$ and a $V_{50}$ of 1808 ft/sec. Peel resistance of this blend was not tested but it was projected that it would be better than that of vinyl ester alone.

What is claimed is:

1. An impact resistant composite comprised of two or more layers; at least two of said layers being two adjacent fibrous layers each comprising a network of filaments having a tensile modulus of at least about 150 g/denier, an energy-to-break of at least about 8 J/g and a tenacity equal to or greater than about 7 g/denier in a rigid matrix wherein said matrix comprises a blend of one or more thermosetting resins, one or more thermoplastic resins and an effective amount of an initiating/compatibilization agent, wherein the peel strength between adjacent fibrous layers is at least about 3.0 lbs/in as determined by the peel resistance test of ASTM-D-1876-72, and which initiating/compatibilization agent comprises an initiating and compatibilization agent.

2. A composite according to claim 1 wherein said filaments have a tensile modulus of at least about 150 g/denier, an energy-to-break of at least about 8 J/g and a tenacity equal to or greater than about 7 g/denier.

3. A composite as recited in claim 2 wherein the filaments have tenacity equal to or greater than about 10 g/d, a tensile modulus equal to or greater than about 300 g/d and an energy-to-break equal to or greater than about 10 J/g.

4. A composite as recited in claim 3 wherein said tenacity is equal to or greater than about 20 g/d, said tensile modulus is equal to or greater than about 500 g/d and said energy-to-break is equal to or greater than about 15 J/g.

5. A composite as recited in claim 4 wherein said tenacity is equal to or greater than about 25 g/d, said tensile modulus is equal to or greater than about 1000 g/d, and said energy-to-break is equal to or greater than about 20 J/g.

6. A composite as recited in claim 5 wherein said tenacity is equal to or greater than about 30 g/d, said tensile modulus is equal to or greater than about 1300 g/d and the energy-to-break is equal to or greater than about 40 J/g.

7. A composite as recited in claim 1 wherein said filaments are polyethylene filaments having a tenacity equal to or greater than about 20 g/denier, a tensile modulus of at least about 800 g/denier and an energy-to-break of at least about 35 J/g.

8. A composite as recited in claim 1 wherein said peel strength is equal to or greater than about 6 lbs/in.

9. A composite as recited in claim 1 wherein said peel strength is equal to or greater than about 8 lbs/in.

10. A composite as recited in claim 1 wherein said network of filaments comprises a sheet-like filament array in which said filaments are arranged substantially parallel to one another along a common filament direction.

11. A composite as recited in claim 10 wherein said composite comprises more than one layer, with adjacent layers aligned 90° with respect to the longitudinal axis of the parallel filaments contained in said layers.

12. A composite as recited in claim 1 wherein said network of filaments comprises a non-woven fabric.

13. A composite as recited in claim 1 wherein said network of filaments comprises a woven fabric.

14. A composite as recited in claim 1 wherein the volume fraction of said filaments is at least about 0.4.

15. A composite as recited in claim 1 wherein said matrix material comprises one or more thermosetting resins selected from the group consisting of vinyl esters, phenolic, epoxies, allylics, urethanes, unsaturated polyesters and alkyds, and one or more thermoplastic resins selected from the group consisting of polyamides, polystyrene-polyisoprene-polystyrene block copolymer, polyacrylics, polycarbonates, polyurethanes, polyarylene oxides, polyarylene sulfones, polyarylene sulfides, polyacetals, polyvinyl acetate, polyether ether ketones, polyaramids, polyesteramides, and polyimides.

16. A composite as recited in claim 15 wherein said thermosetting resins are selected from the group consisting of vinyl esters, phenolics and epoxies, and said thermoplastic resins are selected from the group consisting of polyurethanes and polyamides.

17. A composite as recited in claim 1 wherein said matrix comprises a thermoplastic polyurethane and a thermosetting vinyl ester.

18. A composite as recited in claim 1 wherein the matrix comprises a thermoplastic polystyrene-polyisoprene-polystyrene block copolymer and a thermosetting vinyl ester.

19. A composite according to claim 1 wherein the tensile modulus of said matrix material is equal to or greater than about 3,450 kPa.

20. A composite according to claim 1 which further comprises at least one layer of a hard rigid material.

21. A composite according to claim 20 wherein said rigid material is selected from the group consisting of metals, ceramics, and glass reinforced polymers.

22. A composite as recited in claim 1 wherein said effective amount is at least about 1% by weight of the blend.

23. A composite as recited in claim 22 wherein said effective amount is from about 1% by weight to about 20% by weight of the blend.

24. A composite as recited in claim 23 wherein said effective amount is from about 1% by weight to about 10% by weight of the blend.

* * * * *